(12) United States Patent
Cider, III

(10) Patent No.: US 7,188,845 B1
(45) Date of Patent: Mar. 13, 2007

(54) COMBINED WAGON AND ASSOCIATED BRAKE ASSEMBLY

(76) Inventor: Joseph Cider, III, 1904 Louise Dr., Glenshaw, PA (US) 15116

( * ) Notice: Subject to any disclaimer, the term of this patent is extended or adjusted under 35 U.S.C. 154(b) by 0 days.

(21) Appl. No.: 11/203,834

(22) Filed: Aug. 16, 2005

(51) Int. Cl.
*B62B 3/00* (2006.01)
*B60T 1/00* (2006.01)

(52) U.S. Cl. ............... 280/47.34; 280/47.11; 188/21; 188/22

(58) Field of Classification Search .......... 280/47.34, 280/47.35, 486, 79.2, 5.26, 87.01, 656, 659, 280/657, 43.12; 188/21, 17, 10, 216, 206 R
See application file for complete search history.

(56) References Cited

U.S. PATENT DOCUMENTS

| | | | | |
|---|---|---|---|---|
| 2,389,320 | A | * | 11/1945 | Nance ........................ 188/21 |
| 2,453,363 | A | * | 11/1948 | Duffy ......................... 188/17 |
| 2,670,057 | A | * | 2/1954 | Ellcock ...................... 188/10 |
| 2,953,389 | A | | 9/1960 | Green et al. |
| 3,313,378 | A | * | 4/1967 | Gordon et al. ................ 188/21 |
| 3,322,436 | A | | 5/1967 | Musichuk |
| 3,664,465 | A | * | 5/1972 | Holland ...................... 188/10 |
| 4,076,266 | A | | 2/1978 | Krausz |
| 4,134,599 | A | * | 1/1979 | DiMille et al. ........... 280/87.01 |
| 4,142,732 | A | * | 3/1979 | Boyd ........................ 280/5.26 |
| 4,159,119 | A | | 6/1979 | Smith |
| 4,819,767 | A | * | 4/1989 | Laird ......................... 188/21 |
| D301,157 | S | | 5/1989 | Hess |
| 5,531,295 | A | * | 7/1996 | Kopman et al. .............. 188/21 |
| 5,690,191 | A | | 11/1997 | Burbank |
| 6,206,385 | B1 | * | 3/2001 | Kern et al. ............... 280/47.35 |
| 6,409,187 | B1 | * | 6/2002 | Crow, Jr. ................. 280/47.34 |
| 6,508,479 | B1 | * | 1/2003 | Tseng ..................... 280/47.34 |

* cited by examiner

*Primary Examiner*—Hau Phan

(57) ABSTRACT

A wagon and brake assembly includes a wagon including a platform having a top surface, a handle section attached to a proximal platform end, and sides protruding upwardly from the platform. The platform is provided with a bore that is intercalated between the platform top and bottom surfaces. Wheels are conjoined to the wagon. A rear axle has opposed ends attached to the rear wheels and is distally spaced from the bore. A pair of support brackets has opposed ends abutted with the platform bottom surface and the axle. A braking mechanism is included for inhibiting a rotational movement of the axle and the rear pair of wheels. The braking mechanism is engageable with the axle while being spaced therefrom, is spaced from the rear pair of wheels, and is medially disposed therebetween such that a user can quickly and efficiently access the braking mechanism during operating conditions.

15 Claims, 4 Drawing Sheets

COMBINED WAGON AND ASSOCIATED BRAKE ASSEMBLY

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to brake assemblies and, more particularly, to a combined wagon and associated brake assembly.

2. Prior Art

Any parent knows the joy that their child receives from playing with a toy wagon either by themselves or while being pulled around by another person.

Most children's wagons available at the present time are not equipped with brakes, and consequently the wagons are stopped by children sliding their shoes on the pavement or ground. Children who ride in their wagons on side walks and other concrete surfaces often wear out a pair of shoes, such as sneakers, in about a week. This is due primarily to scuffing and scraping their shoes on the concrete surface.

Stopping a wagon with one's shoes holds further danger and disadvantages apart from wearing out the soles of ones shoes on concrete surfaces. If the wagon is traveling at a high velocity and the child accidentally pushes down on the concrete or ground surface with too much force their foot or feet will stop while the wagon continues to travel forward. This causes their leg to bend backwards in a quick and unnatural way that can result in the child being thrown from the wagon and sustaining painful scrapes to various parts of their body. More serious injuries may include the child spraining their ankle, or even breaking their ankle, leg and/or arm as they are thrown from the wagon. The advantage of employing brakes in children's wagons is thus obvious.

The use of brake assemblies are known in the prior art. More specifically, brake assemblies heretofore devised and utilized are known to consist basically of familiar, expected and obvious structural configurations, notwithstanding the myriad of designs encompassed by the crowded prior art which have been developed for the fulfillment of countless objectives and requirements.

Accordingly, a need remains for a combined wagon and associated brake assembly in order to overcome the above-noted shortcomings. The present invention satisfies such a need by providing a combined wagon and brake assembly that is easy and convenient to use, adaptable to a variety of children's vehicular toys, and gives parents peace of mind knowing that their children are safe while playing with their wagon. Such brakes make the assembly easy to stop and maneuver, and allows parents to more comfortably transport their child in the wagon, for instance, while shopping. The brakes prevent the wagon from going out of control on an inclined surface and also allows for improved overall speed control. The combined wagon and associated brake assembly is appreciated by children as a riding toy and by adults as a safe and convenient way to transport their child and/or cargo.

BRIEF SUMMARY OF THE INVENTION

In view of the foregoing background, it is therefore an object of the present invention to provide a combined wagon and associated brake assembly. These and other objects, features, and advantages of the invention are provided by a combined wagon and brake assembly for allowing safe and effortless transport of children and cargo positioned therein.

The combined wagon and brake assembly includes a wagon including an elongated platform that has a planar top surface and a centrally registered longitudinal axis. Such a wagon further includes an elongated and rectilinear handle section pivotally attached thereto and located adjacent to a proximal end portion of the platform. The wagon also includes a plurality of monolithically formed sides protruding upwardly from the platform and extending along a perimeter of the platform respectively. Such a platform is provided with an axially aligned bore formed therein and extending parallel to the axis wherein the bore is intercalated between the top surface and a bottom surface of the platform.

A plurality of wheels are rotatably and operably conjoined to the wagon. The rear pair of wheels has a diameter greater than a diameter of the disc respectively. An elongated and linear rear axle has opposed end portions directly and securely attached to a rear pair of the wheels respectively. Such an axle is distally spaced from the bore and oriented orthogonal thereto. The axle centrally preferably passes through the disc and the rear pair wheels. A pair of L-shaped support brackets has opposed end portions directly abutted with a bottom surface of the platform and the axle respectively. The axle is effectively maintained at a fixed spatial relationship with the platform during operating conditions.

A braking mechanism is included for contemporaneously inhibiting a rotational movement of the axle and the rear pair of wheels. Such a braking mechanism is operably engageable with the axle while being spaced therefrom. The braking mechanism is spaced from the rear pair of wheels and is medially disposed therebetween such that a user can advantageously quickly and efficiently access the braking mechanism during operating conditions.

The braking mechanism preferably includes a brake handle directly attached to the handle section of the wagon in such a manner that the user can conveniently and selectively bias the brake handle between engaged and disengaged positions while maintaining a firm grip on the handle section with one hand. A disc is directly conjoined to the axle. Such a disc maintains a static spatial relationship with the axle and rotates in sync therewith. The disc may be coaxially aligned with the rear pair wheels.

A caliper section includes a plurality of calipers and associated brake pads directly connected thereto respectively. Such a caliper section further includes a mounting bracket directly conjoined to the platform and the calipers such that the brake pads are suspended from a bottom surface of the platform and laterally adjacent the disc during operating conditions. A cable is directly conjoined to the brake handle and the calipers. The cable is preferably directed through the bore and isolated from ambient debris during operating conditions. Such a cable is adaptable between alternate tensions for effectively biasing the calipers against the disc during operating conditions. The brake pads selectively engage the disc when the user toggles the brake handle to the engaged position, thereby causing the axle and the wheels to simultaneously stop rotating while the brake pads remain spaced from the axle and the rear pair of wheels.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
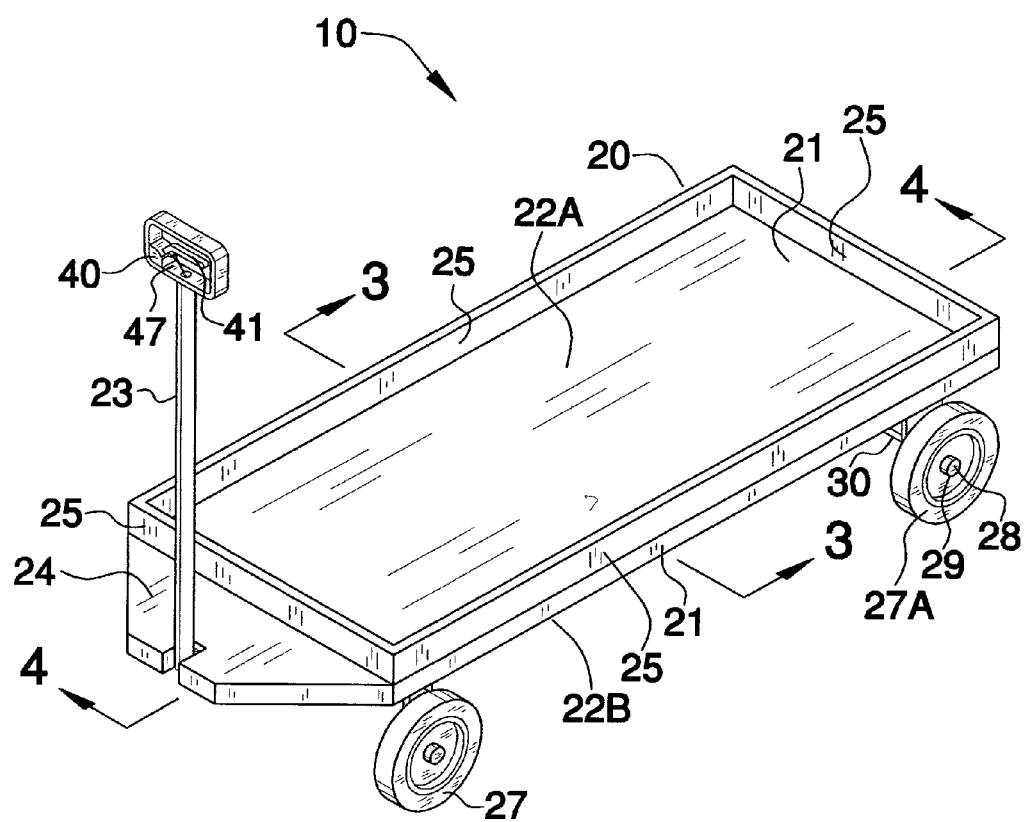
FIG. 1 is a perspective view showing a combined wagon and associated brake assembly, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1–4 by the reference numeral 10 and is intended to provide a combined wagon and associated brake assembly. It should be understood that the assembly 10 may be used to provide breaking means to many different types of children's vehicle toys and should not be limited in use to only children's wagons.

Referring initially to FIGS. 1 through 4, the assembly 10 includes a wagon 20 including an elongated platform 21 that has a planar top surface 22A and a centrally registered longitudinal axis. Of course, the wagon 20 may be produced in a variety of different shapes, sizes and colors so as to find appeal among an increased number of user, as is obvious to a person of ordinary skill in the art. Such a wagon 20 further includes an elongated and rectilinear handle section 23 pivotally attached thereto and located adjacent to a proximal end portion 24 of the platform 21. The pivotal nature of the handle section 23 is essential and advantageous for both allowing a person seated within the wagon 20 or a person walking ahead of the assembly 10 to engage or disengage the braking mechanism 40 (described herein below).

Figure 3:
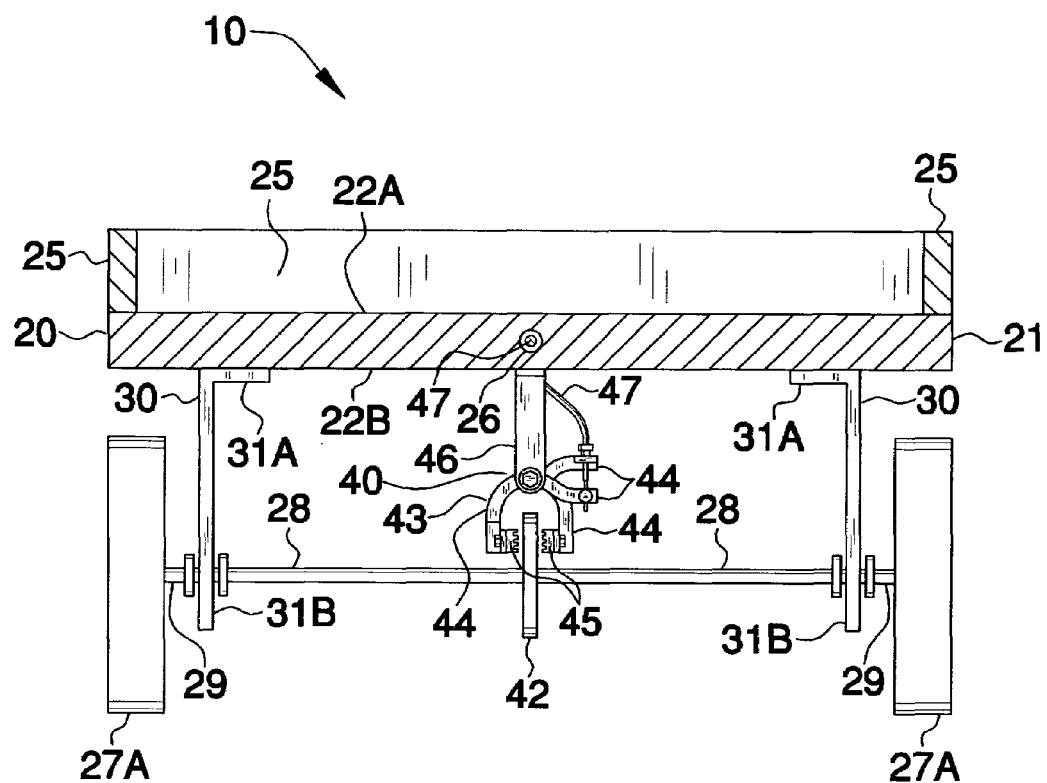
FIG. 3 is a cross-sectional view of the wagon platform shown in FIG. 1, taken along line 3—3 and showing the bore positioned therein.
Figure 4:
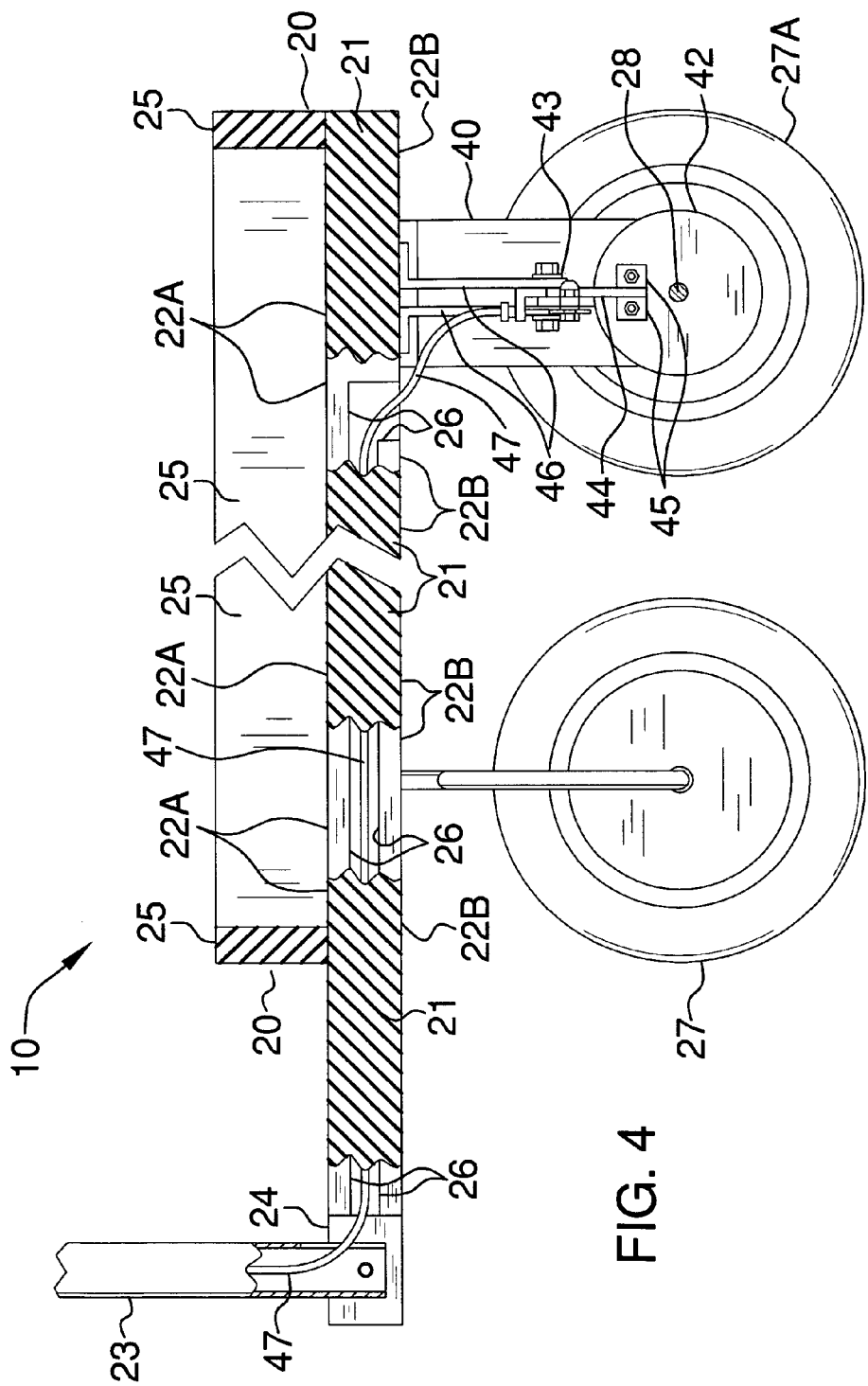
FIG. 4 is an enlarged cross-sectional view of the wagon platform shown in FIG. 2, taken along line 4—4.

Referring to FIGS. 1, 3 and 4, the wagon 20 also includes a plurality of monolithically formed sides 25 protruding upwardly from the platform 21 and extending along a perimeter of the platform 21 respectively. The plurality of sides 25 of the platform 21 are vital and advantageous for preventing a person of cargo items stored within the wagon 21 from laterally sliding off of the platform 21. Such a platform 21 is provided with an axially aligned bore 26 formed therein and extending parallel to the axis wherein the bore 26 is intercalated between the top surface 22A and a bottom surface 22B (described herein below) of the platform 21.

Referring to FIGS. 1 through 4, a plurality of wheels 27 are rotatably and operably conjoined to the wagon. The rear pair of wheels 27A (described herein below) has a diameter greater than a diameter of the disc 42 (described herein below) respectively. An elongated and linear rear axle 28 has opposed end portions 29 directly and securely attached, with no intervening elements, to a rear pair of the wheels 27A respectively. Of course, axle 28 can be removably attached to wheels 27A via conventional fasteners and, advantageously, via cotter pins (not shown). Cotter pins overcome a shortcoming of conventional axle-wheel attachments designed heretofore by allowing the user to quickly and effectively change a wheel during periodic use. It is also noted, various shaped axles can be employed by the present invention. Such alternate axles may include oval, annular and square cross-sections respectively as long as the axle 28 of choice is statically affixed to the wheels 27A. In other words, the wheels 27A cannot be rotatably mounted to the axle 28 because the braking mechanism 40 is directly engageable with the axle 28 and not the wheels 27A. Therefore, it is critical for the present invention to have a statically affixed wheel-axle arrangement so that the wheels 27A rotate in sync with axle 28.

Such an axle 28 is distally spaced from the bore 26 and oriented orthogonal thereto. The axle 28 passes centrally through the disc 42 and the rear pair wheels 27A. A pair of L-shaped support brackets 30 has opposed end portions 31A, 31B directly abutted, with no intervening elements, with a bottom surface 22B of the platform 21 and the axle 28 respectively. The axle 28 is effectively maintained at a fixed spatial relationship with the platform 21 during operating conditions, which is important and advantageous for ensuring a continuous and smooth rotation of the axle 28 and the rear pair of wheels 27A during operating conditions.

Still referring to FIGS. 1 through 4, a braking mechanism 40 is included for contemporaneously inhibiting a rotational movement of the axle 28 and the rear pair of wheels 27A. Such a braking mechanism 40 is operably engageable with the axle 28 while being spaced therefrom. The braking mechanism 40 is spaced from the rear pair of wheels 27A and is medially disposed therebetween such that a user can advantageously quickly and efficiently access the braking mechanism 40 during operating conditions.

Again referring to FIGS. 1 through 4, the braking mechanism 40 includes a brake handle 41 directly attached, with no intervening elements, to the handle section 23 of the wagon 20 in such a manner that is important for allowing the user to conveniently and selectively bias the brake handle 41 between engaged and disengaged positions while maintaining a firm grip on the handle section 23 with one hand, as is best shown in FIG. 1. A disc 42 is directly conjoined, with no intervening elements, to the axle 28. Such a disc 42 maintains a static spatial relationship with the axle 28 and rotates in sync therewith. Of course, the disc 42 may be welded, bolted or monolithically formed with the axle 28, as well known to a person of ordinary skill in the art, as long as the disc-axle connection ensures that the disc 42, axle 28 and wheels 27A rotates in sync during operating conditions. This feature is essential for ensuring the proper operation of the braking mechanism 40 since, as friction is applied to the disk 42 a rotation thereof is decreased, which in turn decreases the rotation of the axle 28 and the rear wheels 27A attached thereto, thus reducing a forward or backward motion of the assembly 10. The disc 42 is coaxially aligned with the rear pair wheels 27A.

Figure 2:
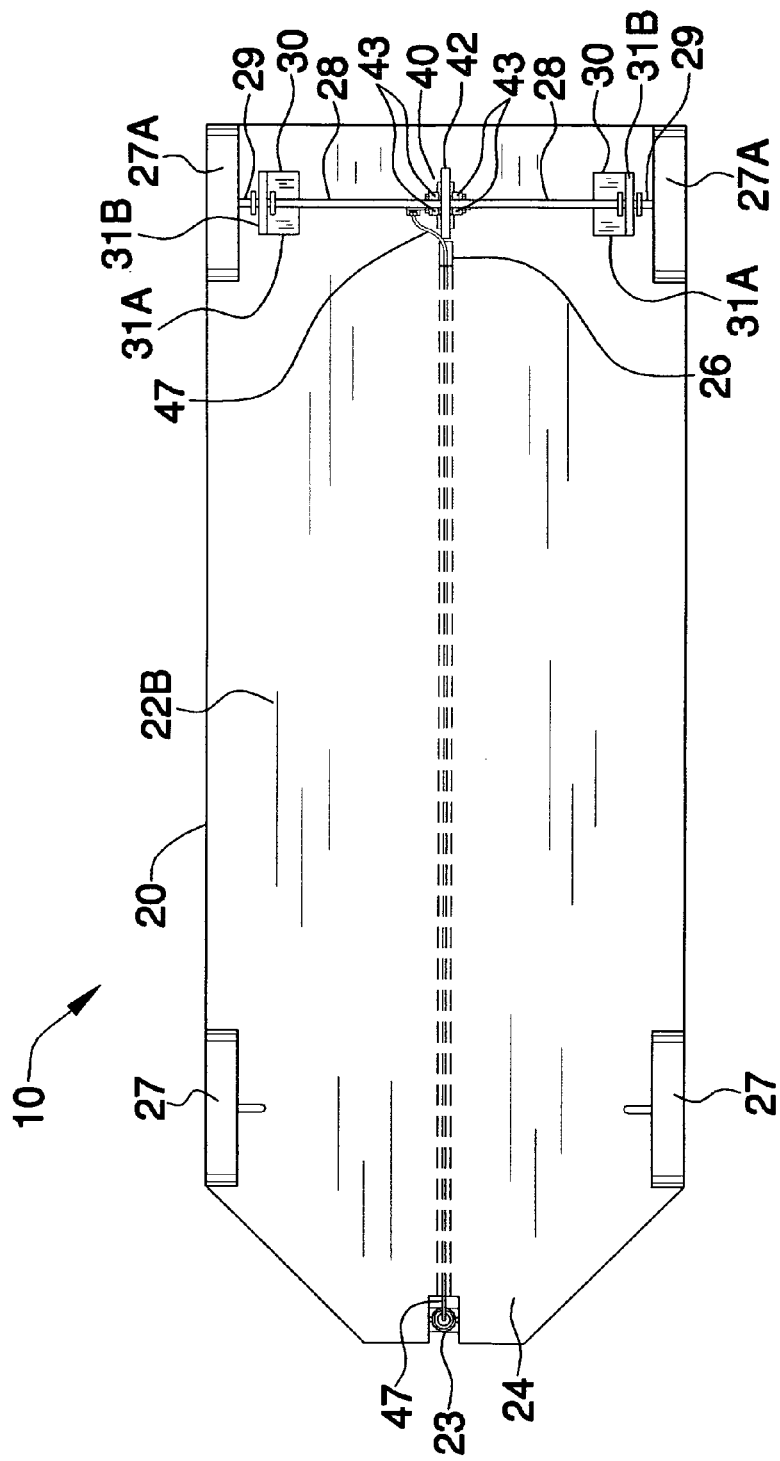
FIG. 2 is a bottom plan view of the assembly shown in FIG. 1.

Referring to FIGS. 2, 3 and 4, a caliper section 43 includes a plurality of calipers 44 and associated brake pads 45 directly connected, with no intervening elements, thereto respectively. Such a caliper section 43 further includes a mounting bracket 46 directly conjoined, with no intervening elements, to the platform 21 and the calipers 44 such that the brake pads 45 are suspended from a bottom surface 22B of the platform 21 and positioned laterally adjacent to the disc 42 during operating conditions. A cable 47 is directly conjoined, with no intervening elements, to the brake handle 41 and the calipers 44. The cable 47 is directed through the bore 26 and isolated from ambient debris during operating conditions. Such a cable 47 is adaptable between alternate tensions, which are a critical feature for effectively biasing the calipers 44 against the disc 42 during operating conditions. The brake pads 45 selectively engage the disc 42 when the user toggles the brake handle 41 to the engaged position, thereby causing the axle 28 and the wheels 27 to simultaneously stop rotating while the brake pads 45 remain spaced from the axle 28 and the rear pair of wheels 27A.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An apparatus for transporting objects, said apparatus comprising:
   a wagon including an elongated platform having a planar top surface and a centrally registered longitudinal axis, said wagon further including an elongated and rectilinear handle section pivotally attached thereto and located adjacent a proximal end portion of said platform, said wagon further including a plurality of monolithically formed sides protruding upwardly from said platform and extending along a perimeter of said platform respectively, said platform being provided with an axially aligned bore formed therein and extending parallel to the axis wherein the bore is intercalated between said top surface and a bottom surface of said platform;
   a plurality of wheels rotatably and operably conjoined to said wagon;
   an elongated and linear rear axle having opposed end portions directly and securely attached to a rear pair of said wheels respectively, said axle being distally spaced from the bore and oriented orthogonal thereto; and
   braking means for contemporaneously inhibiting a rotational movement of said axle and said rear pair of wheels;
   wherein said braking means is operably engageable with said axle while being spaced therefrom, said braking means being spaced from said rear pair of wheels and medially disposed therebetween such that a user can quickly and efficiently access said braking means during operating conditions.

2. The assembly of claim 1, wherein said braking means comprises:
   a brake handle directly attached to said handle section of said wagon in such a manner that the user can selectively bias said brake handle between engaged and disengaged positions while maintaining a firm grip on said handle section with one hand;
   a disc directly conjoined to said axle, said disc maintaining a static spatial relationship with said axle and rotating in sync therewith;
   a caliper section including a plurality of calipers and associated brake pads directly connected thereto respectively, said caliper section further including a mounting bracket directly conjoined to said platform and said calipers such that said brake pads are suspended from a bottom surface of said platform and laterally adjacent said disc during operating conditions; and
   a cable directly conjoined to said brake handle and said calipers, said cable being adaptable between alternate tensions for biasing said calipers against said disc during operating conditions;
   wherein said brake pads selectively engage said disc when the user toggles said brake handle to the engaged position and thereby causing said axle and said wheels to simultaneously stop rotating while said brake pads remain spaced from said axle and said rear pair of wheels.

3. The assembly of claim 2, wherein said disc is coaxially aligned with said rear pair wheels.

4. The assembly of claim 2, wherein said axle centrally passes through said disc and said rear pair wheels.

5. The assembly of claim 2, wherein said cable is directed through the bore and isolated from ambient debris during operating conditions.

6. An apparatus for transporting objects, said apparatus comprising:
   a wagon including an elongated platform having a planar top surface and a centrally registered longitudinal axis, said wagon further including an elongated and rectilinear handle section pivotally attached thereto and located adjacent a proximal end portion of said platform, said wagon further including a plurality of monolithically formed sides protruding upwardly from said platform and extending along a perimeter of said platform respectively, said platform being provided with an axially aligned bore formed therein and extending parallel to the axis wherein the bore is intercalated between said top surface and a bottom surface of said platform;

a plurality of wheels rotatably and operably conjoined to said wagon;

an elongated and linear rear axle having opposed end portions directly and securely attached to a rear pair of said wheels respectively, said axle being distally spaced from the bore and oriented orthogonal thereto;

a pair of L-shaped support brackets having opposed end portions directly abutted with a bottom surface of said platform and said axle respectively, said axle being maintaining at a fixed spatial relationship with said platform during operating conditions; and braking means for contemporaneously inhibiting a rotational movement of said axle and said rear pair of wheels;

wherein said braking means is operably engageable with said axle while being spaced therefrom, said braking means being spaced from said rear pair of wheels and medially disposed therebetween such that a user can quickly and efficiently access said braking means during operating conditions.

7. The assembly of claim 6, wherein said braking means comprises:

a brake handle directly attached to said handle section of said wagon in such a manner that the user can selectively bias said brake handle between engaged and disengaged positions while maintaining a firm grip on said handle section with one hand;

a disc directly conjoined to said axle, said disc maintaining a static spatial relationship with said axle and rotating in sync therewith;

a caliper section including a plurality of calipers and associated brake pads directly connected thereto respectively, said caliper section further including a mounting bracket directly conjoined to said platform and said calipers such that said brake pads are suspended from a bottom surface of said platform and laterally adjacent said disc during operating conditions;

a cable directly conjoined to said brake handle and said calipers, said cable being adaptable between alternate tensions for biasing said calipers against said disc during operating conditions;

wherein said brake pads selectively engage said disc when the user toggles said brake handle to the engaged position and thereby causing said axle and said wheels to simultaneously stop rotating while said brake pads remain spaced from said axle and said rear pair of wheels.

8. The assembly of claim 7, wherein said disc is coaxially aligned with said rear pair wheels.

9. The assembly of claim 7, wherein said axle centrally passes through said disc and said rear pair wheels.

10. The assembly of claim 7, wherein said cable is directed through the bore and isolated from ambient debris during operating conditions.

11. An apparatus for transporting objects, said apparatus comprising:

a wagon including an elongated platform having a planar top surface and a centrally registered longitudinal axis, said wagon further including an elongated and rectilinear handle section pivotally attached thereto and located adjacent a proximal end portion of said platform, said wagon further including a plurality of monolithically formed sides protruding upwardly from said platform and extending along a perimeter of said platform respectively, said platform being provided with an axially aligned bore formed therein and extending parallel to the axis wherein the bore is intercalated between said top surface and a bottom surface of said platform;

a plurality of wheels rotatably and operably conjoined to said wagon, wherein said rear pair of wheels have a diameter greater than a diameter of said disc respectively;

an elongated and linear rear axle having opposed end portions directly and securely attached to a rear pair of said wheels respectively, said axle being distally spaced from the bore and oriented orthogonal thereto;

a pair of L-shaped support brackets having opposed end portions directly abutted with a bottom surface of said platform and said axle respectively, said axle being maintaining at a fixed spatial relationship with said platform during operating conditions; and braking means for contemporaneously inhibiting a rotational movement of said axle and said rear pair of wheels;

wherein said braking means is operably engageable with said axle while being spaced therefrom, said braking means being spaced from said rear pair of wheels and medially disposed therebetween such that a user can quickly and efficiently access said braking means during operating conditions.

12. The assembly of claim 11, wherein said braking means comprises:

a brake handle directly attached to said handle section of said wagon in such a manner that the user can selectively bias said brake handle between engaged and disengaged positions while maintaining a firm grip on said handle section with one hand;

a disc directly conjoined to said axle, said disc maintaining a static spatial relationship with said axle and rotating in sync therewith;

a caliper section including a plurality of calipers and associated brake pads directly connected thereto respectively, said caliper section further including a mounting bracket directly conjoined to said platform and said calipers such that said brake pads are suspended from a bottom surface of said platform and laterally adjacent said disc during operating conditions; and a cable directly conjoined to said brake handle and said calipers, said cable being adaptable between alternate tensions for biasing said calipers against said disc during operating conditions;

wherein said brake pads selectively engage said disc when the user toggles said brake handle to the engaged position and thereby causing said axle and said wheels to simultaneously stop rotating while said brake pads remain spaced from said axle and said rear pair of wheels.

13. The assembly of claim 12, wherein said disc is coaxially aligned with said rear pair wheels.

14. The assembly of claim 12, wherein said axle centrally passes through said disc and said rear pair wheels.

15. The assembly of claim 12, wherein said cable is directed through the bore and isolated from ambient debris during operating conditions.

* * * * *